(12) United States Patent
Suyash

(10) Patent No.: US 11,508,170 B2
(45) Date of Patent: Nov. 22, 2022

(54) DIGITAL HANDWRITING SYNTHESIS

(71) Applicant: Adobe Inc., San Jose, CA (US)

(72) Inventor: Suyash, Lucknow (IN)

(73) Assignee: Adobe Inc., San Jose, CA (US)

( * ) Notice: Subject to any disclaimer, the term of this patent is extended or adjusted under 35 U.S.C. 154(b) by 331 days.

(21) Appl. No.: 16/813,144

(22) Filed: Mar. 9, 2020

(65) Prior Publication Data

US 2021/0279457 A1    Sep. 9, 2021

(51) Int. Cl.

| | |
|---|---|
| G06F 3/0488 | (2022.01) |
| G06V 30/32 | (2022.01) |
| G06F 17/18 | (2006.01) |
| G06N 20/00 | (2019.01) |
| G06F 3/04883 | (2022.01) |

(52) U.S. Cl.
CPC .......... G06V 30/32 (2022.01); G06F 3/04883 (2013.01); G06F 17/18 (2013.01); G06N 20/00 (2019.01)

(58) Field of Classification Search
CPC .... G06F 3/04883; G06F 40/171; G06F 17/18; G06F 3/0488; G06F 40/10; G06N 20/00; G06N 3/08; G06K 9/00; G06K 9/00402
See application file for complete search history.

(56) References Cited

U.S. PATENT DOCUMENTS

| | | | |
|---|---|---|---|
| 7,227,993 B2* | 6/2007 | Xu ...................... | G06V 30/1423 |
| | | | 382/187 |
| 2019/0087653 A1* | 3/2019 | Resendez Rodriguez ................... |
| | | | G06V 30/226 |
| 2020/0065370 A1* | 2/2020 | Mannby ................ | G06F 40/171 |
| 2020/0257898 A1* | 8/2020 | Cirimele ............... | G06F 40/171 |

OTHER PUBLICATIONS

"Google Pixelbook", Retrieved at: https://store.google.com/us/product/google_pixelbook—on Dec. 12, 2019, 1 page.
"Apple Pencil", Retrieved at: https://www.apple.com/apple-pencil/—on Dec. 12, 2019, 11 pages.
"Savitzky-Golay filter—Wikipedia", Retrieved at: https://en.wikipedia.org/wiki/Savitzky-Golay_filter—on Dec. 12, 2019, 15 pages.
(Continued)

*Primary Examiner* — Tuan H Nguyen
(74) *Attorney, Agent, or Firm* — FIG. 1 Patents

(57) ABSTRACT

Digital handwriting synthesis techniques and systems are described that are configured to process text represented using text fields into one or more digital ink strokes to represent the text as handwritten data when rendered in a user interface of a computing device. Additionally, the digital handwriting synthesis techniques are configurable using normalization parameters to adjust an output from a machine learning model such that these techniques are extensible across a wide range of machine learning models and may be used to support a wide range of different digital ink styles. Further, the techniques described herein also support customization via "few shot conditioning" in which the digital ink styles may be further customized based on a user input and in this way support previously unseen digital ink styles.

18 Claims, 8 Drawing Sheets

(56) References Cited

OTHER PUBLICATIONS

"Microsoft Surface", Retrieved at: https://www.microsoft.com/en-us/surface—on Dec. 12, 2019, 19 pages.
"Glue Benchmark Leaderboard", Retrieved at: https://gluebenchmark.com/leaderboard—Dec. 12, 2019, 3 pages.
Bishop,"Pattern Recognition and Machine Learning", Springer 2006, Jan. 2006, 758 pages.
Graves,"Generating Sequences with Recurrent Neural Networks", Aug. 2013, 43 pages.
Liwicki,"IAM-OnDB—an On-Line English Sentence Database Acquired from Handwritten Text on a Whiteboard", Mar. 2014, 6 pages.
Vaswani,"Attention Is All You Need", Dec. 6, 2017, 15 pages.

\* cited by examiner

400

```
┌─────────────────────────────────────────────────────┐
│ 402                                                 │
│ Receive text entered via a first user input         │
└─────────────────────────────────────────────────────┘
                           │
                           ▼
┌─────────────────────────────────────────────────────┐
│ 404                                                 │
│ Receive normalization parameters corresponding      │
│ to a second user input                              │
└─────────────────────────────────────────────────────┘
                           │
                           ▼
┌─────────────────────────────────────────────────────┐
│ 406                                                 │
│ Synthesize digital handwriting based on the text by │
│ a machine-learning model                            │
│ ┌─────────────────────────────────────────────────┐ │
│ │ 408                                             │ │
│ │ Generate stroke prediction data describing at   │ │
│ │ least one digital ink stroke based on the text  │ │
│ │ that is adjusted to correspond to the particular│ │
│ │ digital ink style based on the normalization    │ │
│ │ parameters                                      │ │
│ └─────────────────────────────────────────────────┘ │
└─────────────────────────────────────────────────────┘
                           │
                           ▼
┌─────────────────────────────────────────────────────┐
│ 410                                                 │
│ Output the digital handwriting data as configured   │
│ for rendering in a user interface by a display      │
│ device                                              │
└─────────────────────────────────────────────────────┘
```

Fig. 4

DIGITAL HANDWRITING SYNTHESIS

BACKGROUND

The types and ways in which digital content is exposed to users to mimic familiar real-world interaction is ever increasing. An example of this involves customization of the digital content to mimic real world mediums to improve a user's experience with a computing device. For example, text was originally communicated and rendered by a computing device using a single font.

Additional fonts were subsequently developed to provide additional user options in how text is rendered by computing devices. However, these options still lack a look and feel of how users communicate in the real world absent the computing device, e.g., pen and paper.

To address this, conventional techniques have been developed to support stylus-based inputs. However, these conventional techniques are typically limited to accepting inputs of handwritten text and converting the handwritten text into typed text. Consequently, conventional techniques are not capable of converting typed text to appear as handwritten text is a manner that may be personalized and customized for a particular user.

SUMMARY

Digital handwriting synthesis techniques and systems are described that are configured to process text represented using text fields (e.g., typed text) into one or more digital ink strokes to represent the text as handwritten data when rendered in a user interface of a computing device. Additionally, the digital handwriting synthesis techniques are configurable using normalization parameters to support a wide range of different digital ink styles. Further, the techniques described herein also support customization via "few shot conditioning" in which the digital ink styles may be further customized based on a user input, e.g., of handwritten text entered via a stylus, and in this way support previously unseen digital ink styles.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 4 is a flow diagram depicting a procedure in an example implementation in which stroke prediction data is generated and normalized using normalization parameters to generate digital handwriting data in a particular digital ink style.

DETAILED DESCRIPTION

Overview

Figure 1:
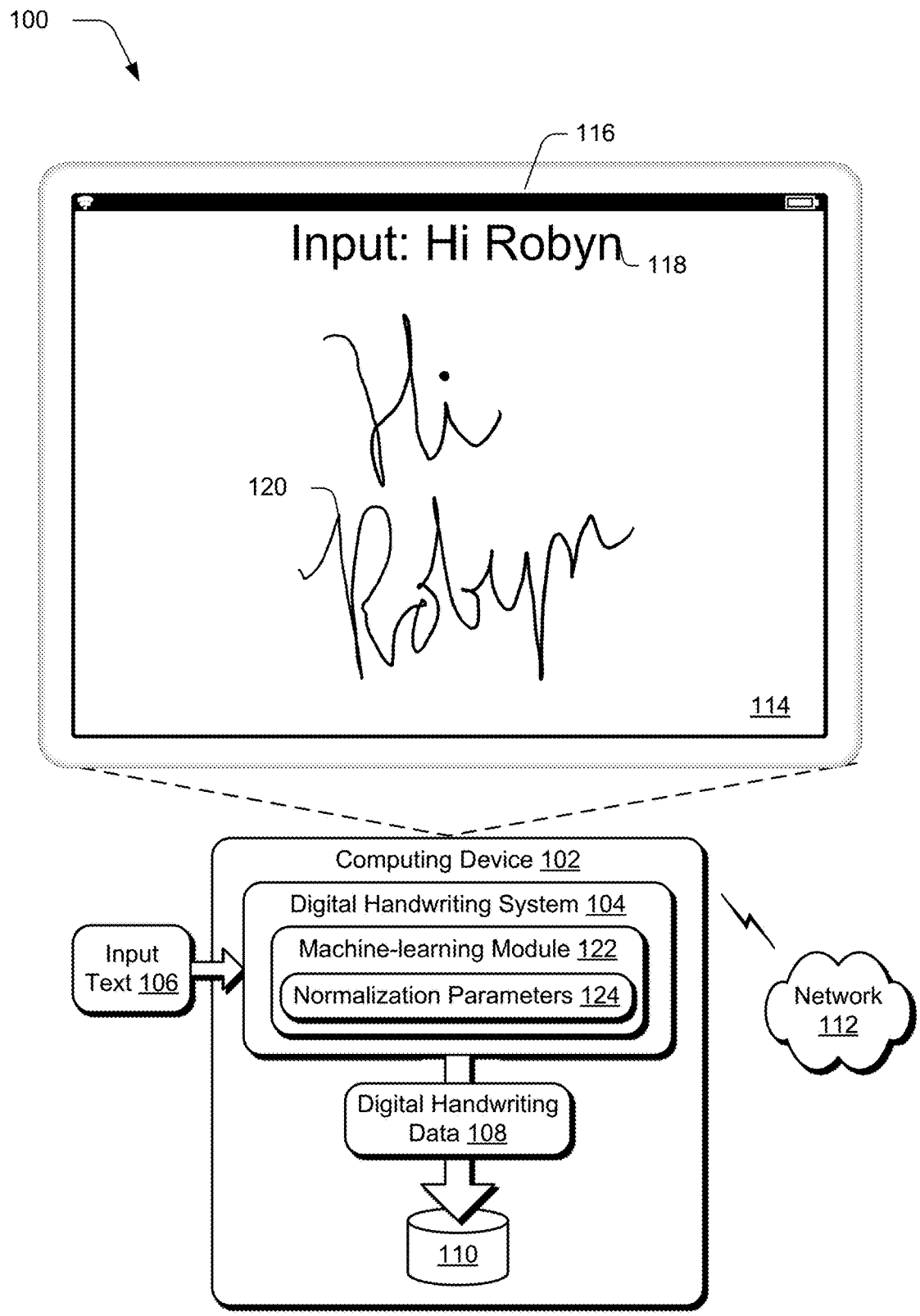
FIG. 1 is an illustration of an environment in an example implementation that is operable to employ digital handwriting synthesis techniques described herein.

Conventional techniques involving digital content and handwriting are typically limited to stylus inputs. The stylus inputs are entered as a freeform user input of handwritten text, which may then be converted into typed text. Although techniques have been developed to convert text represented using text fields (e.g., typed text for use with different fonts) to digital ink strokes as handwritten text, these techniques are typically limited to a single generic style, are not extensible, are computationally inefficient, and support limited display richness as being limited to addressing characters of the input text, individually, over a series of time steps.

According, digital handwriting synthesis techniques and systems are described. The digital handwriting synthesis techniques are configured to process text represented using text fields (e.g., typed text) into one or more digital ink strokes to represent the text as digital handwriting data when rendered in a user interface of a computing device. The digital handwriting synthesis techniques are also configurable using normalization parameters to adjust an output from a machine learning model (e.g., for a particular digital ink style) such that these techniques are extensible across a wide range of machine learning models and may be used to support a wide range of different digital ink styles. Further, the techniques described herein also support customization via "few shot conditioning" in which the digital ink styles may be further customized based on a user input, e.g., of handwritten text entered via a stylus, and in this way support previously unseen digital ink styles.

In one example, text is received by a digital handwriting system via a first user input, e.g., as text fields that represent respective characters that may be entered via a keyboard, speech-to-text functionality, gestures, and so on. A second user input is also received to select a particular digital ink style. The digital handwriting system, for instance, may output options in a user interface that depict a plurality of different digital ink styles and the second input may select one of those options to be applied to the input text.

In response, the digital handwriting system obtains normalization parameters that correspond to the selected digital ink style. The normalization parameters are used by a machine learning model to synthesize digital handwriting data that depicts the text in the corresponding digital ink style.

The machine learning model, for instance, may be configured using decoder layers of a transformer machine learning model. A transformer machine learning model supports processing of each of the characters in the text together, as opposed to being processed as steps in a time sequence using conventional techniques, e.g., such as a recurrent neural network, long short-term memory network (LSTM), and so on. Thus, parallelization supported by the transformer machine learning model may increase accuracy and computational efficiency as opposed to conventional techniques as further described in the following sections. Stroke prediction data is then output by the machine-learning model as generated in an autoregressive fashion that models the text using at least one digital ink stroke.

The normalization parameters corresponding to the selected digital ink style are used by the machine-learning model of the digital handwriting system to adjust the stroke prediction data to support the selected digital ink style. The normalization parameters, for instance, may be incorporated by machine-learning model using conditional normalization layers that are disposed between layers of the transformer machine learning model. In one example, the transformer machine learning is configured using decoder layers of a transformer architecture. Conditional normalization layers are disposed along with the decoder layers to adjust the respective outputs using the normalization parameters such that the stroke prediction data is adjusted (e.g., by position, width, and so on) according to a respective digital ink style, e.g., when rendered in a user interface. In this way, the techniques described herein are extensible to a wide range of machine learning models without direct modification to those underlying machine-learning models. Further, the techniques described herein are also extensible to a wide range of digital ink styles rather than being limited to a single generic style as occurred in conventional techniques through use of the normalization parameters.

These techniques also support efficient customization as part of "few shot learning" to support digital ink styles that have not been previously trained by the system. A third user input, for instance, may be provided to specify a digital ink sample. The digital ink sample may be input in a variety of ways, such as a freeform input using a stylus or cursor control device, a selected digital ink sample from a digital image, selection from stock digital images, and so on. Normalization parameters of a selected digital ink style are then adjusted based on the digital ink sample, e.g., trained using machine learning and a loss function. In this way, a few digital ink samples may be used to extend the digital handwriting system to previously unseen digital ink styles without adjusting underlying machine learning models used to generate the stroke prediction data. Further discussion of these and other examples is included in the following sections and shown using corresponding figures.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the digital handwriting synthesis techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 8.

The computing device 102 is illustrated as including a digital handwriting system 104. The digital handwriting system 104 is implemented at least partially in hardware of the computing device 102 to process and transform input text 106 to synthesize digital handwriting data 108, which is illustrated as maintained in a storage device 110 of the computing device 102. Although illustrated as implemented locally at the computing device 102, functionality of the digital handwriting system 104 may also be implemented as whole or part via functionality available via the network 112, such as part of a web service or "in the cloud."

The computing device 102, for instance, is illustrated as including a user interface 114 as rendered by a display device 116. The input text 106 is illustrated as typed text 118 depicting "Hi Robyn" and may be input in a variety of ways, such as via keyboard, speech-to-text, gestures (using touchscreen functionality), and other input techniques. The typed text 118, for instance, includes text fields that represent respective characters (e.g., alphabetic, punctuation, emojis), which may then be output using a variety of different fonts. In the techniques described herein, however, the digital handwriting system 104 is configured to convert the input text 106 into one or more digital ink strokes 120 as part of the digital handwriting data 108 as shown for the cursive version of "Hi Robyn" of the typed text 118. The digital handwriting data 108 when rendered in the user interface 114, for instance, may mimic handwritten text, digital ink, digital painting as part of a digital canvas, and other forms as part of digital content through use of digital ink strokes.

To do so, the digital handwriting system 104 employs a machine-learning module 122 and normalization parameters 124. The machine-learning module 122 is configured to generate stroke prediction data as one or more digital ink strokes based on the input text 106. The normalization parameters 124 are employed to adjust the stroke prediction data, e.g., as consistent with a particular digital ink style. The normalization parameters 124, for instance, may be used to adjust the stroke prediction data corresponding to a selection of one of a plurality of digital ink styles. Adjustment of the stroke prediction data may include adjusting location, length, location of "pen up" and "pen down" portions of a digital ink stroke, width of the digital ink stroke, and so on.

In this way, the adjustment performed by the normalization parameters 124 is extensible across a variety of different types of machine-learning models and is also extensible across a variety of digital ink styles as further described in relation to FIGS. 2-4 and 6. Further, the normalization parameters 124 may also support "few shot learning" to further extend the system to previously before unseen digital ink styles by learning from a digital ink sample as further described in relation to FIG. 5. An example of configuration of the machine-learning module 122 to support a transformer machine learning model is further described in relation to FIG. 7.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Handwriting Synthesis

Figure 2:
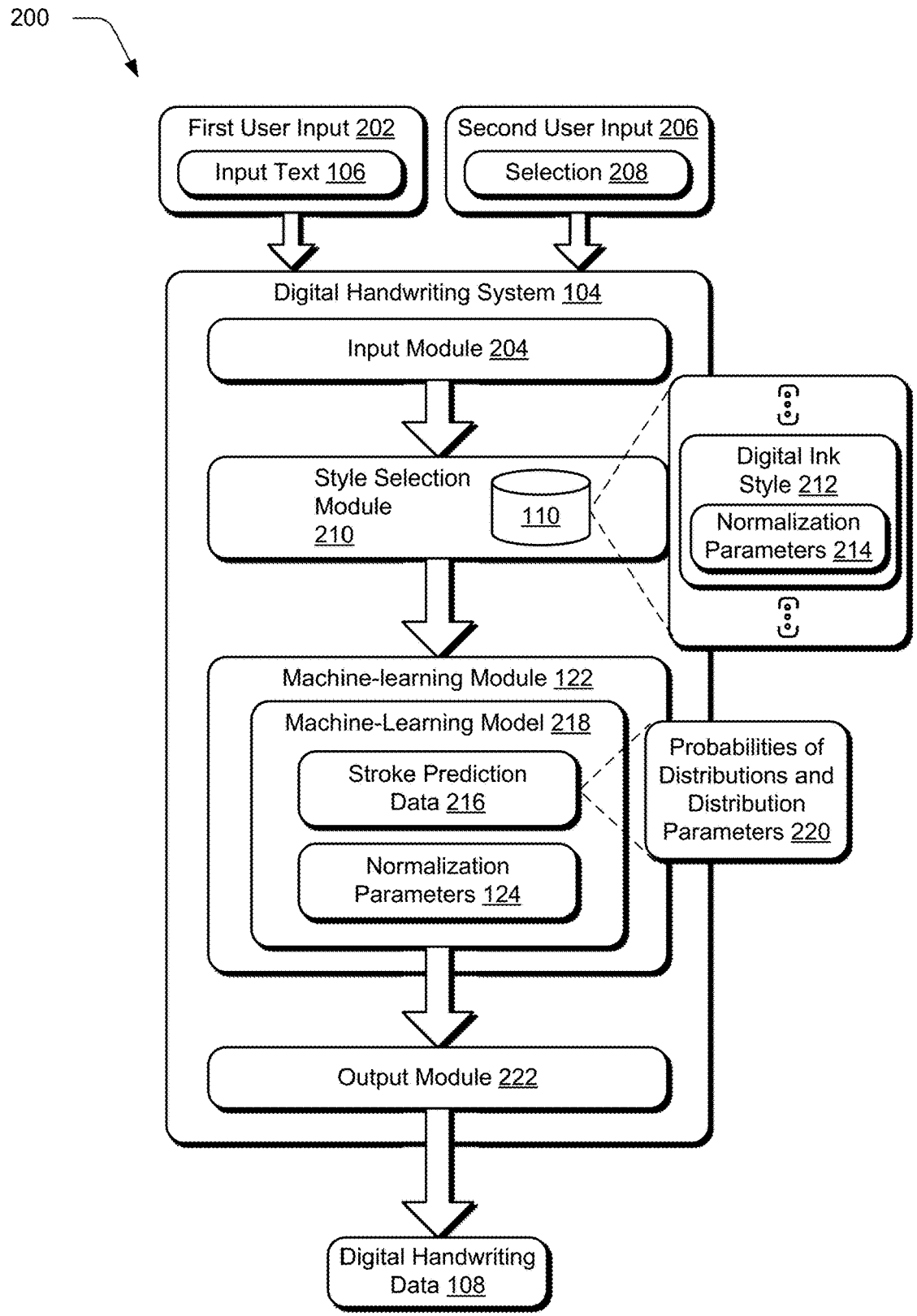
FIG. 2 depicts a digital handwriting system that is configured to synthesize digital handwriting data from input text.
Figure 3:
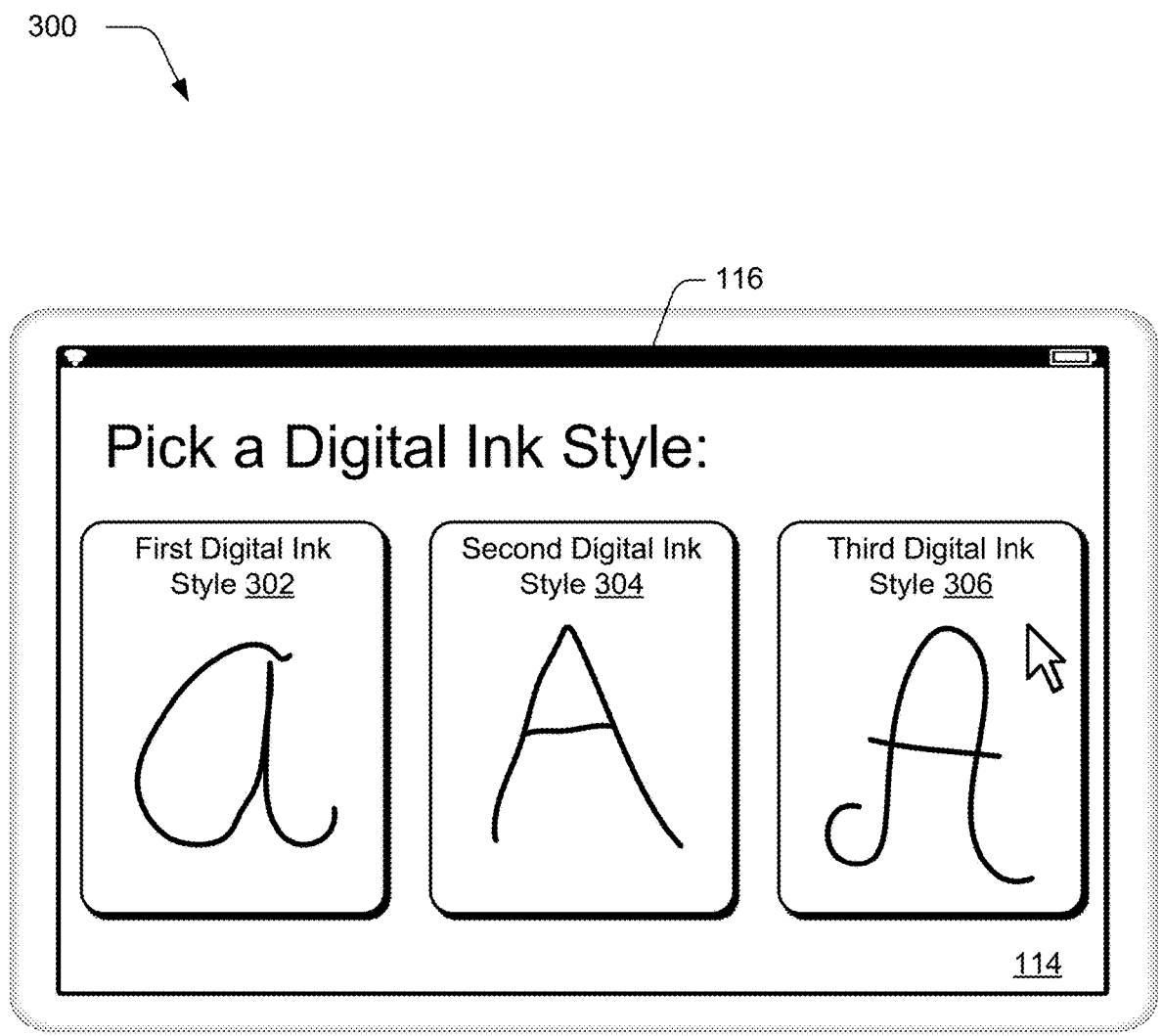
FIG. 3 depicts an example of a computing device as outputting a user interface to select a particular digital ink style.

FIG. 2 depicts a digital handwriting system 200 that is configured to synthesize digital handwriting data from input text. FIG. 3 depicts an example 300 of a computing device as outputting a user interface to select a digital ink style. FIG. 4 depicts a procedure 400 in an example implementation in which stroke prediction data is generated and normalized using normalization parameters to generate digital handwriting data in accordance with a particular digital ink style.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

To begin in this example, input text 106 is received by an input module 204 of the digital handwriting system 104 via a first user input 202 (block 402). As previously described, input text 106 may be generated in a variety of ways. Input text 106, for instance, may be entered via a keyboard, via speech-to-text functionality, via a gesture, via a natural user interface, and so forth. The input text 106 may include text fields that specify particular alphabetic characters, punctuation, emojis, and so on. The text fields may then be rendered in accordance with a font for display in the user interface as typed text, e.g., as illustrated as "Hi Robyn" for the typed text 118.

In the illustrated example, a second user input 206 is also received that includes a selection 208 of a digital ink style from a plurality of digital ink styles. A style selection module 210, for instance, may maintain a plurality of digital ink styles 212 having normalization parameters 214 in a storage device 110. The plurality of digital ink styles 212 may then be output in a user interface as options for user selection.

As shown in the example 300 of FIG. 3, for instance, the user interface 114 is rendered by the display device 116 of the computing device 102. The user interface 114 includes a plurality of options that are user selectable to indicate which digital ink style of the plurality of digital ink styles is desired for generating digital ink strokes to represent the input text 106. Illustrated examples include a first digital ink style 302, a second digital ink style 304, and a third digital ink style 306 along with examples of digital ink strokes for the respective digital ink styles. The second user input 206 is implemented by selecting from these options to generate the selection 208. Based on the selection 208, the normalization parameters 214 are then output by the style selection module 210 as normalization parameters 124.

Digital handwriting data 108 is then synthesized by the machine-learning module based on the text by a machine learning model (block 406). To do so, stroke prediction data is generated by a machine-learning model 218218 describing at least one digital ink stroke based on the text 106 and is adjusted to correspond to the particular digital ink style based on the normalization parameters 124 (block 408). The digital handwriting data 108 is then output by an output module 222, such as to a storage device 110, for rendering in a user interface 114, and so on.

The machine-learning model 218, for instance, may generate probabilities of distributions and distribution parameters 220 for the digital ink stroke which are adjusted by the normalization parameters 124. Samples are taken from these distributions to generate the actual digital ink stroke described in the digital handwriting data 108. In this way, the digital ink strokes incorporate variance even for similar characters and words to further mimic real-world handwriting. Machine-learning models 218 used to generate these probabilities may be configured in a variety of ways, such as through use of a deep learning neural network.

One such example is configured as a transformer machine learning model. A transformer machine learning model is trained using an entire sequence of text in parallel, instead of one timestep at a time. In recurrent neural networks, for instance, text can be viewed as a sequence of inputs over t timesteps, where t is the length of the sequence. For example, if the input is "Few Shot Conditional Handwriting Synthesis", then input at time 0 is "F", at time 1 is "e" and so on. Transformer machine learning models, on the other hand, are capable of training using the entire input at the same time. This means that the entire sentence "Few Shot Conditional Handwriting Synthesis" is an input to the digital handwriting system 104 and the system looks at the entire sentence instead of one token (e.g., character or timestep) at a time when predicting the output. Further discussion of transformer machine learning models may be found in relation to FIG. 7.

The normalization parameters 124, for instance, may specify adjustments to be made to position (e.g., X/Y position), width, length, and so on of digital ink strokes described in the stroke prediction data 216. In this way, the digital handwriting data 108 generated using the normalization parameters 214 may mimic real world handwriting using a respective digital ink style 212.

This may include indications of when to detect an "end of stroke" by modeling "pen up" and "pen down" as part of generating points of the digital ink stroke. When training, this information is provided in the training dataset to perform machine learning. The machine-learning model 218 outputs as part of the probabilities of distributions and distribution parameters 220 a probability that a current point in a digital ink stroke is the end of the stroke.

The X and Y coordinates of the points of digital ink stroke are modelled in an autoregressive fashion. As mentioned before, the machine-learning model 218 may implement a transformer architecture, which means that an entire sequence of the input text 106 may be fed in parallel as further described in relation to FIG. 7. For example, a sequence of points having a length of 200, ((x1, y1, p1), (x2, y2, p2), (x3, y3, p3) . . . (x200, y200, p200)), is first divided into two sequences of length 199, s1 ((x1, y1, p1), (x2, y2, p2), (x3, y3, p3) . . . (x199, y199, p199)), and s2 ((x2, y2, p2), (x3, y3, p3) . . . (x200, y200, p200)). The sequence s1 above is one of the inputs to the model, and s2 is the output.

The input text 106 is input in an offset-text attention layer, where the machine-learning model 218 computes attention weights correlating different sections of the digital ink strokes with different sections of the input text. A two variable gaussian mixture model is used to model the two variables (the X and Y coordinates) of the digital ink stroke, e.g., a multivariate Gaussian mixture model. "Mixture" refers to a set of options available at each step. Therefore, instead of predicting a single set points for the digital ink stroke, a set of probabilities is predicted, which may be weighted and used to then sample points used to define the output digital ink stroke. During training, these probabilities are predicted and the negative log is calculated of a product of the probabilities as a loss function.

An additional input, the normalization parameters 214 ("factors") are used to apply the specific digital ink style 212 when generating the digital handwriting data 108. Factors, for instance, may be specify using a one-dimensional vector. For example, if the digital handwriting system 104 models eight different digital ink styles 212, then the selection 208 input may be configured as [0, 0, 0, 0, 0, 1, 0, 0] to indicate use of the 6th digital ink style to generate the digital handwriting data 108. Therefore, in order to generate the stroke prediction data 216 a first input point is (0, 0), and the probabilities of the distributions and the distribution parameters 220 are used to obtain a next point in the digital ink stroke, which continues until an end of the digital ink stroke is reached. The normalization parameters 124 may also support further customization as part of "few shot conditioning" as further described below.

Figure 5:
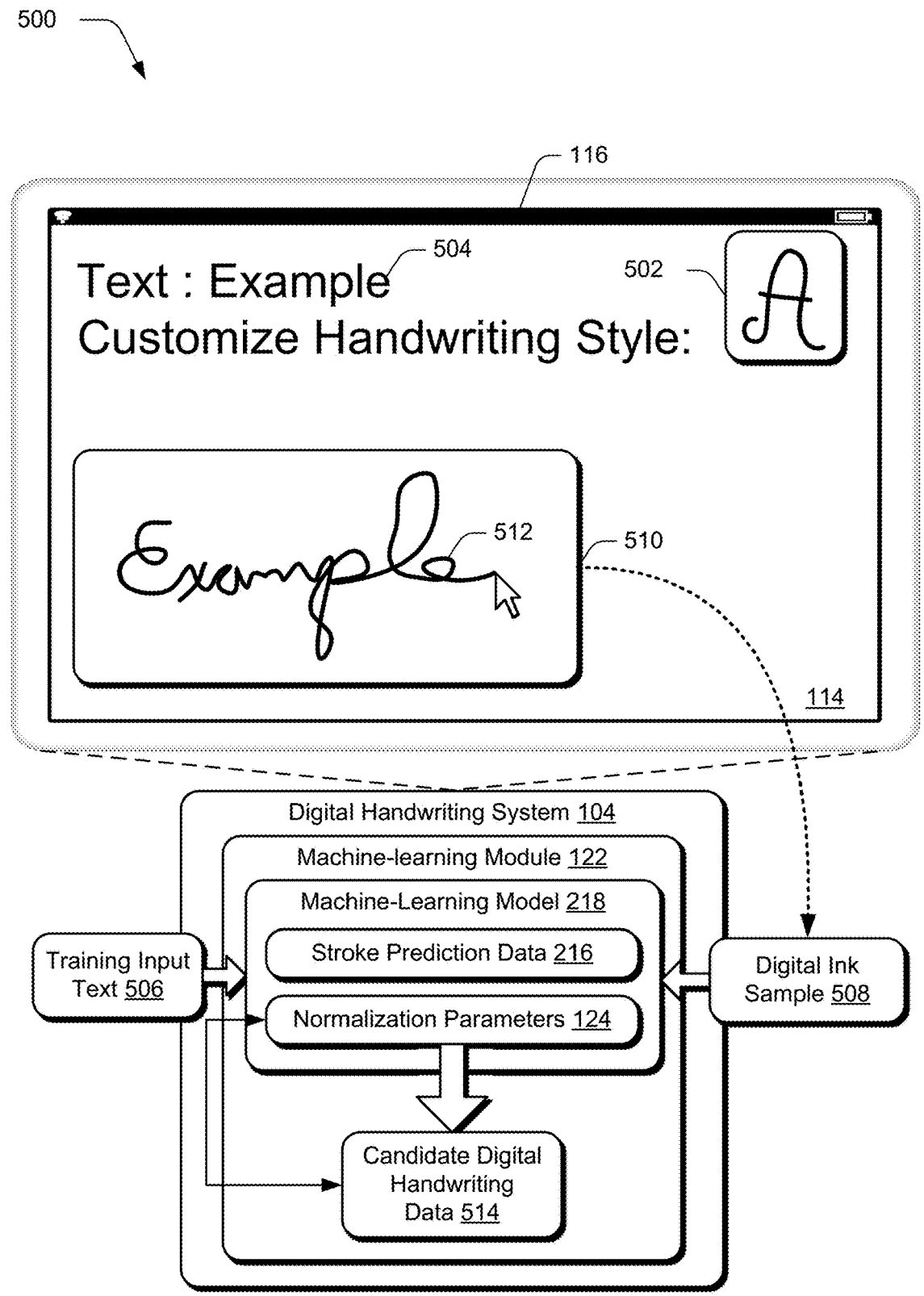
FIG. 5 depicts an example implementation and FIG. 6 depicts a procedure of few shot conditional training based on a digital ink sample.
Figure 6:
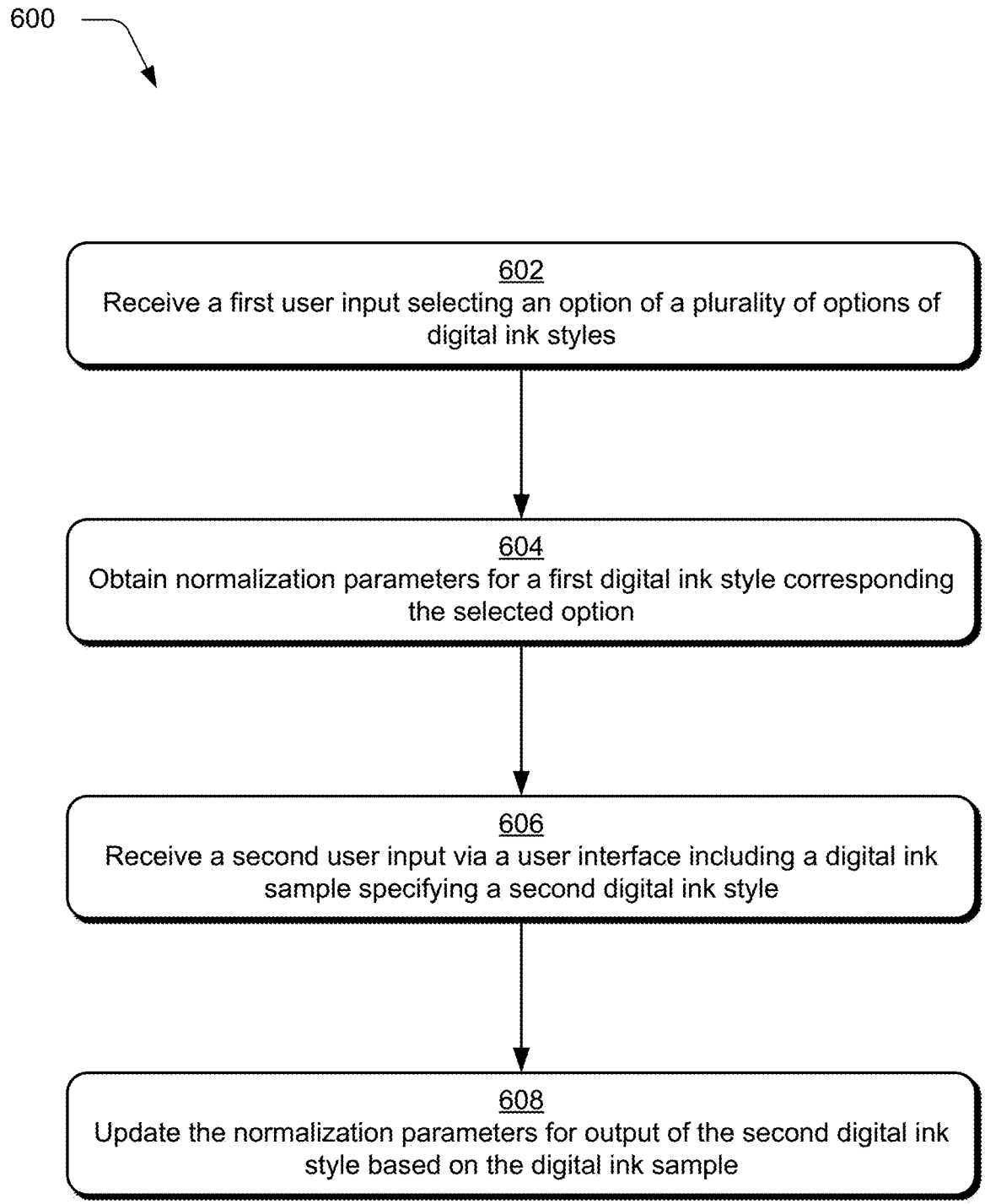

FIG. 5 depicts an example implementation 500 of training normalization parameters 124 of the machine-learning model 218 based on a digital ink sample. As previously described, conditional normalization layers that implement the normalization parameters 124 as part of the machine learning model 218 may be conditionally trained to model specific digital ink styles. As a result, the digital handwriting system 104 is few-shot enabled to generate digital handwriting data in a specific user's handwriting style and has increased computational efficiency over conventional techniques.

Conventional techniques, for instance, use a mechanism called "priming", which first takes a plurality of existing input-output pair of text and pen strokes and concatenates the input to prime the model to generate an output in a desired digital ink style. In the techniques described herein however, the normalization parameters 214 are updated to learn style specific characteristics, thus reducing an amount of data to be used in priming. This is an advantage since the maximum length of the text that conventional systems can successfully model is fixed, thus zero-shot generation enables generation of longer sequences in specific handwriting styles.

To begin in this example, a first user input is received selecting an option of a plurality of options of digital ink styles (block 602). As depicted in FIG. 3, the user interface 114 includes a plurality of options that are user selectable to select from the plurality of digital ink styles for generating digital ink strokes. Illustrated examples include a first digital ink style 302, a second digital ink style 304, and a third digital ink style 306. Therefore, the user input is implemented in this example by selecting from these options that is closest to a desired digital ink style. Based on the selection, normalization parameters 124 are obtained for the digital ink style corresponding to the selected option (block 604).

A representation 502 of the selected digital ink style is that output in the user interface 114 as shown in FIG. 5. The user interface 114 then provides an option to further customize the selected digital ink style. To do so, a text input portion 504 is provided via which a user may specify training input text 506, "example," as typed text.

A second user input is received via the user interface 114 by the digital handwriting system 104, the second user input includes a digital ink sample 508 specifying a second digital ink style (block 606). The user interface 114 includes an option 510 via which freeform text 512 (e.g., a stylus, touchscreen functionality, and so on) may be entered to capture the user's digital ink style. In this way, the digital ink sample 508 may correspond to a particular user. Other examples are also contemplated, such as to select a digital ink sample input by another source, e.g., from a historical figure, a predefined input example from a stock digital image source, and so forth.

The training input text 506 and the digital ink sample 508 are then used to update the normalization parameters 124 to generate digital handwriting data in a digital ink style consistent with the sample. The machine-learning model 218, for instance, may process the training input text 506 to generate stroke prediction data 216. As part of this, the stroke prediction data 216 is adjusted using the normalization parameters 124 as before to generate candidate digital handwriting data 514. The candidate digital handwriting data 514 is compared to the digital ink sample 508 using a loss function to train the normalization parameters 124 of the machine-learning model 218 to output the digital ink style. The normalization parameters 214 are thus updated for output of the second digital ink style based on that the digital ink sample 508 (block 608).

Thus, because the digital handwriting system 104 is capable of intrinsically capturing styles, the system can be extended to incorporate new styles from a reduced amount of user input in comparison with conventional techniques. In the example above, for instance, an existing digital ink style is progressively modified until it approximates a desired digital ink style. Further discussion of these and other examples may be found in the following implementation example section.

Implementation Example

Figure 7:
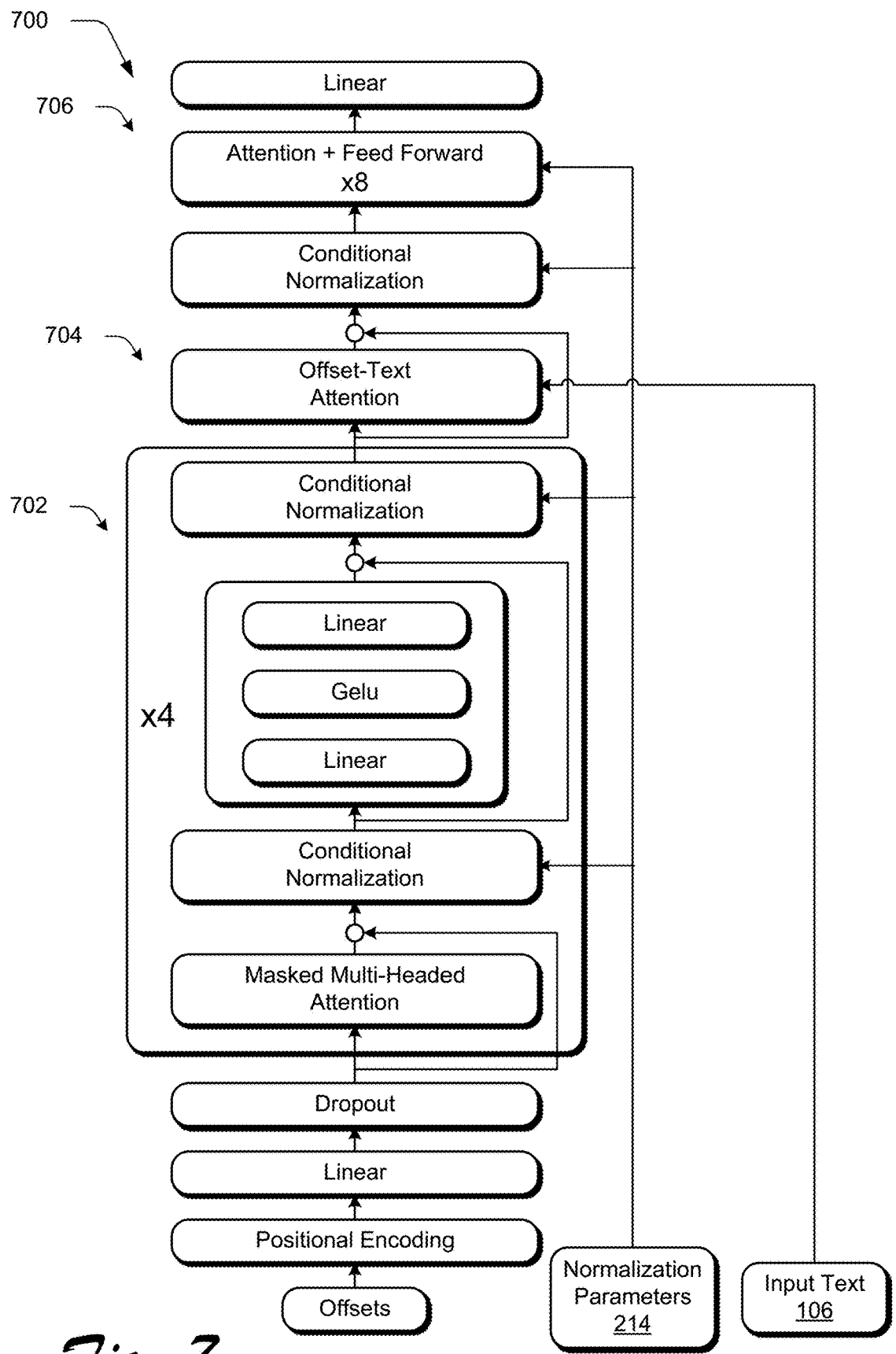
FIG. 7 depicts an example implementation in which a machine-learning model of FIG. 2 is implemented as a transformer machine learning model and the normalization parameters are implemented using conditional layers disposed between layers of the transformer machine learning model.

FIG. 7 depicts an example implementation 700 in which the machine-learning model 218 is implemented as a transformer machine learning model and the normalization model 222 is implemented as conditional layers disposed between layers of the transformer machine learning model. For training, an IAM Online Handwriting Dataset was used in this implementation example. The dataset contains 12,195 handwriting samples with information about prompt text and coordinate points for handwritten text generated by tracking pen location on a whiteboard, as the user writes the prompt text. The dataset provides the actual text and the coordinates for the handwritten strokes, along with basic writer information.

For training the dataset, first the input points are realigned by fitting a simple linear regression model to the X and Y Coordinates. For a single variable, the relationship between X and Y can be represented as follows:

$$Y = X_1\beta_1 + \beta_0 = \begin{bmatrix} 1 & X_1 \end{bmatrix} \begin{bmatrix} \beta_0 \\ \beta_1 \end{bmatrix} = X\beta$$

The closed form linear solution for a single variable linear regression is given by:

$$\beta = (X^T X)^{-1} X^T Y$$

The Y offset is removed from the points by:

$$\tilde{Y} = Y - \beta_0$$

Therefore, the angle of rotation of the fit from the X axis is given by:

$$\theta = \tan^{-1}(\beta_1)$$

The points are rotated such that the slope of the fit is zero:

$$M = [X \quad \tilde{Y}]$$

$$\tilde{M} = M \begin{bmatrix} \cos(\theta) & -\sin(\theta) \\ \sin(\theta) & \cos(\theta) \end{bmatrix}$$

From this, a set of points is obtained along the X axis. Noise may also be removed from the set of points, e.g., by applying a Savitsky-Golay filter for smoothing and removing extreme outliers.

As with time-series modelling in general, the change between successive points is modeled, instead of absolute values. Accordingly, the strokes are converted into offsets as follows:

$$\hat{Y} = [y_1 \ldots y_n] - [y_0 \ldots y_{n-1}]$$

$$\hat{X} = [x_1 \ldots x_n] - [x_0 \ldots y_{x-1}]$$

The starting offset is set to 0 for both $\hat{X}$ and $\hat{Y}$. Along with $\hat{X}$ and $\hat{Y}$, the input also contains an integer that is 1 for each point that ends the current stroke, and signals lifting the pen, and zero otherwise.

The stroke prediction data 216 models a set of continuous, real-valued outputs as digital ink strokes, instead of as discrete values from a dictionary. Because of this, standard cross-entropy loss is inefficient. A standard regression loss is also not applicable because the outputs are not deterministic, since at each point there are multiple possibilities for the next digital ink stroke, even within the same digital ink style. Thus, stroke prediction data 216 is used to predict a set of possible outcomes, while modelling the probabilities of the different outcomes separately, e.g., a series of outcomes through Gaussian distributions such that the output is sampled from those distributions.

In general, for every input sequence, a mixture of K multivariate Gaussian mixtures is modeled. The Probability Distribution Function for a two variable Gaussian Distribution is given by:

$$P(x, y) = \frac{1}{2\pi\sigma_x\sigma_y\sqrt{1-\rho^2}}$$

$$\exp\left(\frac{-1}{2(1-\rho^2)}\left(\frac{(x-\mu_x)^2}{\sigma_x^2} + \frac{(y-\mu_y)^2}{\sigma_y^2} - \frac{2\rho(x-\mu_x)(y-\mu_y)}{\sigma_x\sigma_y}\right)\right)$$

Given a target point $(x_i, y_i)$ and a set of K predicted P, the loss function to be minimize may be represented as:

$$L(x_i, y_i) = -\log\left(\sum_j^K (\pi_j P_j(x_i, y_i))\right)$$

where $\pi$ is the posterior probability of the individual distributions themselves. Hence, a model is employed to predict K distributions, such that L is computed for each of the input pairs, and the model is trained using Gradient Descent.

Transformer machine learning models are a sequence-to-sequence model architecture usable to model sequences directly using attention blocks over multiple timesteps, thus removing the constraint of working solely within a single timestep, as is required using recurrent neural networks.

For autoregressive modelling in the illustrated example of FIG. 7, decoder modules are used from the transformer architecture. Each module in a decoder block includes two modules, first an attention module that applies masked attention such that the input at position i attends to positions 0 to i–1. In the second step, a two-layer feed-forward block with an activation in the middle is used. After each module, a residual connection is added, followed by layer normalization using conditional normalization layers. The input offsets are modelled using successive layers of these decoder modules, followed by a dense layer to reduce the channel dimension to the number of mixture parameters, which is then followed by generating the mixture outputs.

In order to condition the output to the input text 106, a different attention layer is added in the middle that generates attention weights for each offset input to each character in the input text 106. This layer has been modified to accommodate multiple steps at a time, instead of working with one time-step at a time as with LSTMs and RNNs.

The input text 106 is modelled with a set of mixtures, with the sum across the mixtures used to predict the attention weights. Given sequence input t, for P mixtures, three values, $\alpha$, $\beta$ and $\kappa$ are predicted in the following manner $$\alpha = \text{softplus}(W_\alpha t + b_\alpha)$$

$$\beta = \text{softplus}(W_\beta t + b_\beta)$$

$$\kappa = \text{softplus}(W_\kappa t + b_\kappa)$$

$$\kappa_i = \kappa_i + \left(\sum_1^{i-1} \kappa_j\right) \Big/ \epsilon$$

Here $W_\alpha, W_\beta, W_\kappa \in \mathbb{R}^{d_{model} \times P}$ and $b_\alpha, b_\beta, b_\kappa \in \mathbb{R}^P$ and softplus $(x) = \log(1 + \exp(x))$. $\alpha$ measures importance, $\beta$ measures width and $\kappa$ measures location in the text sequence for an offset position. Since the cumulative sum of all previous positions is added to $\kappa$, it intuitively learns to slide the attention window from left to right, instead of placing it at absolute positions in the text.

Given a text sequence c and a vector u denoting integer values of each possible position in the text input, the attention weights are calculated as:

$$\phi(t, u) = \sum_{p=1}^P \alpha_t^p \exp(-\beta_t^p (\kappa_t^p - u)^2)$$

Even though u is all possible text positions, after computing $\phi$, the weights for all the padding characters are "zeroed out." After which, the output of the attention layer is computed as:

$$w = \phi \cdot c$$

As illustrated in FIG. 7, the transformer machine learning model includes four attention plus feed forward blocks 702, followed by attention over the text 704, followed by eight more attention plus feed forward blocks 706.

In order to model multiple digital ink styles, the normalization layers are modified to model multiple γ and β parameters depending on the input. The rest of the network outside of normalization parameters is shared by all inputs, while for each input, a specific set of γ and β parameters is selected in the normalization layers.

Since the stylistic direction of the predicted points depends on the normalization parameters, a new ink digital ink style may be added to the system by adding another set of γ and β parameters. To do so in the examples described above, a first digital ink style is selected and then modified to fine tune the specific γ and β parameters from the digital ink sample.

Accordingly, a digital handwriting system 104 is described as incorporating a neural network architecture for modelling digital ink strokes such that given an input text, the system can predict a sequence of digital ink strokes in an autoregressive fashion such that when rendered on a canvas, appear as handwritten text. An architectural modification through use of normalization parameters allows the digital handwriting system 104 to model multiple digital ink styles, which enables the system to generate output tailored to the preference of the user.

Additionally, use of a transformer machine learning provides numerous advantages over and overcomes challenges of conventional machine learning techniques for digital handwriting synthesis. The digital handwriting system 104, when based on a transformer architecture, can process entire sequences of text in a single shot, instead of processing one timestep at a time as with Recurrent Neural Nets, LSTMs, and so on. Further, an output may be generated in a specific digital ink style without priming the network as was required in conventional techniques. Instead, the network may be pretrained to generate output in a specific digital ink style without any extra data other than the input text. Other conventional techniques such as RNNs and LSTM's are usable solely to generate output in a style already seen during training, and the network architecture is not extensible.

Example System and Device

Figure 8:
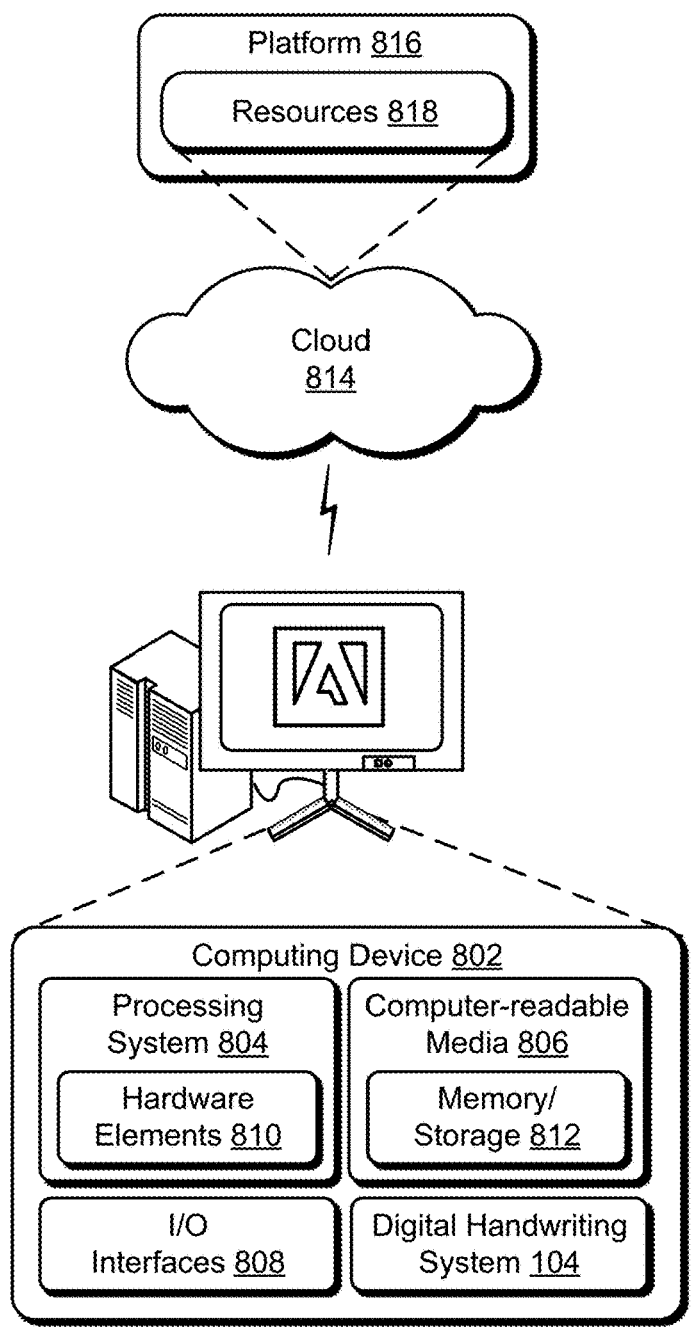
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the digital handwriting system. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   receiving, by the computing device, text entered via a first user input;
   receiving, by the computing device, normalization parameters specified by a second user input, the normalization parameters corresponding to a particular digital ink style;
   synthesizing, by the computing device, digital handwriting data based on the text by a machine-learning model implemented using decoder layers of a transformer machine learning model and the normalization parameters are incorporated by the machine-learning model using layers disposed between the decoder layers of the transformer machine learning model, the synthesizing including:
      generating stroke prediction data describing at least one digital ink stroke based on the text; and
      adjusting the stroke prediction data to correspond to the particular digital ink style based on the normalization parameters; and
   outputting, by the computing device, the digital handwriting data as configured for rendering the text in a user interface by a display device.

2. The method as described in claim 1, wherein the text includes a plurality of characters represented, respectively, using text fields and the generating of the stroke prediction data is performed together for the plurality of characters in the text together by the machine-learning model.

3. The method as described in claim 1, wherein the machine-learning model is configured as a transformer machine learning model.

4. The method as described in claim 1, wherein the second user input selects an option from a plurality of options of digital ink styles displayed in the user interface.

5. The method as described in claim 1, further comprising updating the normalization parameters based on a third user input received via the user interface specifying a digital ink sample.

6. The method as described in claim 1, wherein the generating the stroke prediction data includes:
generating a plurality of probability distribution functions as predicting a series of outcomes; and
sampling the plurality of probability distribution functions to generate the at least one digital ink stroke.

7. The method as described in claim 6, wherein the series of outcomes describes movement in an X/Y direction to a target point.

8. The method as described in claim 1, wherein the digital handwriting data as rendered appears as a handwritten version of the text.

9. The method as described in claim 1, wherein the digital handwriting data as rendered appears as digital paint strokes.

10. The method as described in claim 1, wherein the at least one digital ink stroke is specified in the digital handwriting data using a pen-down indication and a pen-up indication.

11. A system comprising:
an input module implemented by a computing device to receive at least one user input text specifying text and a selection of a digital ink style;
a style selection module implemented by the computing device to obtain normalization parameters corresponding to the digital ink style based on the selection; and
a machine-learning module implemented by the computing device to synthesize digital handwriting data, the machine learning module including a machine-learning model configured to generate stroke prediction data describing at least one digital ink stroke by processing the text and adjust the stroke prediction data based on the normalization parameters, the machine-learning model is implemented using decoder layers of a transformer machine learning model and the normalization parameters are incorporated by the machine-learning model using layers disposed between the decoder layers of the transformer machine learning model.

12. The system as described in claim 11, wherein the text includes a plurality of characters represented, respectively, using a plurality of text fields and the generating of the stroke prediction data is performed in parallel for the plurality of characters in the text together by the machine-learning model configured as a transformer machine learning model.

13. The system as described in claim 11, wherein the machine-learning model is a transformer machine learning model.

14. The system as described in claim 13, further comprising an updating module implemented by the computing device to update the normalization parameters based on a third user input specifying a digital ink sample.

15. The system as described in claim 13, wherein machine-learning module is configured to generate the stroke prediction data by:
generating a plurality of probability distribution functions as predicting a series of outcomes; and
sampling the plurality of probability distribution functions to generate the at least one digital ink stroke.

16. A system comprising:
means for receiving at least one user input text specifying text having a plurality of characters and a selection of a digital ink style;
means for synthesizing digital handwriting data for the plurality of characters in the text by a machine learning model, the machine-learning model configured to generate stroke prediction data describing at least one digital ink stroke by processing the text and adjust the stroke prediction data based on normalization parameters, the machine-learning model is implemented using decoder layers of a transformer machine learning model and the normalization parameters are incorporated by the machine-learning model using layers disposed between the decoder layers of the transformer machine learning model.

17. The system as described in claim 16, wherein the machine-learning model is implemented using a transformer machine learning model.

18. The system as described in claim 16, wherein the parallel processing of the plurality of characters of the text is performed together.

* * * * *